United States Patent
Li et al.

(10) Patent No.: US 12,039,744 B2
(45) Date of Patent: Jul. 16, 2024

(54) FLUORESCENCE IMAGE REGISTRATION METHOD, GENE SEQUENCING INSTRUMENT AND SYSTEM

(71) Applicant: MGI Tech Co., Ltd., Shenzhen (CN)

(72) Inventors: Mei Li, Shenzhen (CN); Yu-Xiang Li, Shenzhen (CN); Yi-Wen Liu, Shenzhen (CN)

(73) Assignee: MGI Tech Co., Ltd., Shenzhen (CN)

( * ) Notice: Subject to any disclaimer, the term of this patent is extended or adjusted under 35 U.S.C. 154(b) by 0 days.

(21) Appl. No.: 18/201,309

(22) Filed: May 24, 2023

(65) Prior Publication Data

US 2023/0298188 A1    Sep. 21, 2023

Related U.S. Application Data

(63) Continuation of application No. 17/043,226, filed as application No. PCT/CN2018/082578 on Apr. 10, 2018, now Pat. No. 11,682,125.

(51) Int. Cl.
G06T 7/00 (2017.01)
G06T 7/33 (2017.01)
G06T 7/70 (2017.01)

(52) U.S. Cl.
CPC ............ G06T 7/337 (2017.01); G06T 7/0012 (2013.01); G06T 7/70 (2017.01);
(Continued)

(58) Field of Classification Search
CPC ......... G06T 7/337; G06T 7/0012; G06T 7/70; G06T 2207/10064; G06T 2207/20021;
(Continued)

(56) References Cited

U.S. PATENT DOCUMENTS

| | | | |
|---|---|---|---|
| 2011/0268347 A1* | 11/2011 | Staker | G06V 10/32 |
| | | | 506/38 |
| 2015/0080231 A1 | 3/2015 | Staker | |
| 2016/0267650 A1 | 9/2016 | Seul et al. | |

FOREIGN PATENT DOCUMENTS

RU    2015143532    4/2017

OTHER PUBLICATIONS

Giannakeas, Nikolaos, and Dimitrios I. Fotiadis. "An automated method for gridding and clustering-based segmentation of cDNA microarray images." Computerized Medical Imaging and Graphics 33.1 (2009): 40-49. https://www.sciencedirect.com/science/article/pii/S0895611108001018 (Year: 2009).*

(Continued)

*Primary Examiner* — Wesley J Tucker
*Assistant Examiner* — Han Hoang
(74) *Attorney, Agent, or Firm* — ScienBiziP, P.C.

(57) ABSTRACT

A fluorescence image registration method includes obtaining at least one fluorescence image of a biochip. An interior local area is selected. Sums of pixel values in the interior local area along a first direction and a second direction are obtained. A plurality of first template lines is selected to find a minimum total value of the sums of pixel values corresponding to the first template lines. Pixel-level correction is performed on a local area of the track line to obtain pixel-level track cross. Other track crosses on the biochip is obtained, and the pixel-level correction is performed on the other track crosses. The position of the pixel-level track line is corrected by a center-of-gravity method to obtain the subpixel-level position of the track line. The subpixel-level positions of all sites uniformly distributed on the biochip is obtained.

16 Claims, 13 Drawing Sheets

(52) U.S. Cl.
CPC ........... *G06T 2207/10064* (2013.01); *G06T 2207/20021* (2013.01); *G06T 2207/30072* (2013.01)

(58) Field of Classification Search
CPC . G06T 2207/30072; G06T 2207/10056; G06T 7/33; G06T 7/30; G06T 7/11; G06T 2207/30241; C12Q 1/6869; C12Q 2563/107; C40B 20/02; G16B 25/00
See application file for complete search history.

(56) References Cited

OTHER PUBLICATIONS

P. Bajcsy, "Gridline: automatic grid alignment DNA microarray scans," in IEEE Transactions on Image Processing, vol. 13, No. 1, pp. 15-25, Jan. 2004, doi: 10.1109/TIP.2003.819941.https://ieeexplore.ieee.org/document/1262009 (Year: 2004).*

* cited by examiner

FLUORESCENCE IMAGE REGISTRATION METHOD, GENE SEQUENCING INSTRUMENT AND SYSTEM

FIELD

The subject matter relates to gene sequencing, and more particularly, to a fluorescent image registration method, a gene sequencing instrument, and a gene sequencing system.

BACKGROUND

This section provides background or context for claims and detailed description of the present disclosure. The description here is not to be seen as prior art just because it is included in this section.

Gene sequencing refers to analysis of a base sequence of specific DNA fragments, which is an arrangement of the bases adenine (A), thymine (T), cytosine (C), and guanine (G). Each of the above four bases carries a different fluorescent group, and different fluorescent groups emit fluorescence of different wavelengths (colors) upon being excited. One of the most commonly used sequencing methods at present is to identify the type of the base to be synthesized by identifying the wavelength of the fluorescence. Thus, the base sequence can be read. The second-generation sequencing technology uses a high-resolution microscopy imaging system to capture fluorescent molecular images of DNA nanoballs (that is, DNB, DNA Nanoballs) on a biochip (gene sequencing chip). The images of fluorescent molecules are sent to a base recognition software. By decoding image signals, the base sequence can be obtained. During actual sequencing process, if there are multiple images of the same scene, the images of the same scene need to be aligned with each other through a positioning and registration method. Then, spot signals are extracted through algorithms, and brightness information is subsequently analyzed and processed to obtain the base sequence. With the development of the second-generation sequencing technology, the sequencing instruments often include software for real-time processing and analyzing of the sequencing data. Most of the sequencing instruments are equipped with registration and positioning algorithms.

Most of the existing registration technologies match similarities based on inherent features of the fluorescence images, and perform extraction and registration to different target features. However, signals of fluorescent molecules in high-resolution microscopy images are point light source signals. In most cases, a neighborhood center-of-gravity method is used, which extracts the pixel values neighboring each site to calculate the center of gravity. However, there is heavy density of the fluorescing signals (base signals) of the second-generation sequencing technology, and some target sites may not be sufficiently bright, which is problematic for existing positioning algorithms.

SUMMARY

Thus, to optimize the positioning and registration operation of the fluorescent groups in the fluorescent image. a fluorescence image registration method, a gene sequencing instrument, a gene sequencing system, and a storage medium are needed.

An aspect of the present disclosure provides a fluorescence image registration method applied to a biochip. A pixel distance between track lines on the biochip is set according to template parameter. The fluorescence image registration method includes obtaining at least one fluorescence image of the biochip. An interior local area of the fluorescence image is selected. Sums of pixel values in the interior local area of the fluorescence image respectively along a first direction and a second direction is obtained, the first direction is perpendicular to the second direction. A plurality of first template lines is selected according to the template parameter, the sums of pixel values respectively along the first direction and the second direction are traversed by the plurality of first template lines, to find a minimum total value of the sums of pixel values corresponding to the plurality of first template lines, a position of the minimum total value corresponds to the track line. Pixel-level correction is performed on a local area of the track line, and the track cross of the track lines after the pixel-level correction is a pixel-level track cross. Other track crosses on the biochip are obtained according to the pixel-level track crosses, and the pixel-level correction is performed on the other track crosses. A position of the pixel-level track line is corrected by a center-of-gravity method to obtain a subpixel-level position of the track line. Subpixel-level positions of all sites uniformly distributed on the biochip is obtained by equal-size grids dividing method.

Furthermore, "obtaining sums of pixel values in the interior local area of the fluorescence image respectively along a first direction and a second direction" includes selecting a plurality of second template lines. The plurality of second template lines is moved in the interior local area of the fluorescent image respectively along the first direction and the second direction. A sum of pixel values in grayscale in the interior local area of the fluorescence image covered by the plurality of second template lines is calculated, the sum of pixel values in grayscale is a sum of the gray values of the pixels covered by the plurality of second template lines.

Furthermore, "selecting a plurality of first template lines according to the template parameter, traversing the sums of pixel values respectively along the first direction and the second direction by the plurality of first template lines, to find a minimum total value of the sums of pixel values corresponding to the plurality of first template lines" includes selecting the plurality of first template lines according to the template parameter. A total value of the sums of pixel values respectively along the first direction and the second direction corresponding to the plurality of first template lines is calculated. The minimum total value among the total value of the sums of pixel values is obtained.

Furthermore, "performing pixel-level correction on a local area of the track line" includes obtaining the sums of pixel values of the local area of the track line along the first direction and the second direction respectively. A plurality of third template lines spaced apart from each other by a predetermined distance is selected, to find the sums of pixel values of the local area of the track line by traversal. A minimum total value of the sums of pixel values corresponding to the plurality of third template lines spaced apart from each other by the predetermined distance is obtained. The pixel-level position of the track line is obtained according to a position corresponding to the minimum total value.

Furthermore, "obtaining the pixel-level position of the track line according to a position corresponding to the minimum total value" includes obtaining a pixel-level position of a valley of W-shaped line according to the position of the minimum total value, wherein the sums of pixel values of the local area of the track line comprises the W-shaped line. The pixel-level position of the track line is obtained according to the pixel-level position of the valley.

Furthermore, "correcting a position of the pixel-level track line by a center-of-gravity method" includes obtaining a local area of the pixel-level track line. A center of gravity of the local area of the pixel-level track line is obtained. A subpixel-level position of the track line is obtained according to the center of gravity.

Furthermore, "obtaining subpixel-level positions of all sites uniformly distributed on the biochip by equal-size grids dividing method" includes obtaining a block area formed by the track crosses of two adjacent subpixel-level track lines along the first direction and the second direction, wherein the sites are arranged on the block area according to a preset rule. The subpixel-level position of all the sites on the block area is obtained by the equal-size grids dividing method.

Another aspect of the present disclosure provides a gene sequencing system applied to a biochip. A pixel distance between track lines on the biochip is set according to template parameter. The gene sequencing system includes an image obtaining module configured to obtain at least one fluorescence image of the biochip. An area selecting module is configured to select an interior local area of the fluorescence image. A sum of pixel values obtaining module is configured to obtain sums of pixel values in the interior local area of the fluorescence image respectively along a first direction and a second direction, the first direction being perpendicular to the second direction. A minimum total value finding module is configured to selecting a plurality of first template lines according to the template parameter, traverse the sums of pixel values respectively along the first direction and the second direction by the plurality of first template lines, to find a minimum total value of the sums of pixel values corresponding to the plurality of first template lines, a position of the minimum total value corresponding to the track line. A pixel-level correcting module is configured to perform pixel-level correction on a local area of the track line, and the track cross of the track lines after the pixel-level correction being a pixel-level track cross. An other track cross obtaining module is configured to obtain other track crosses on the biochip according to the pixel-level track crosses, and perform the pixel-level correction on the other track crosses. A center-of-gravity correcting module is configured to correct a position of the pixel-level track line by a center-of-gravity method to obtain a subpixel-level position of the track line. A subpixel-level site obtaining module is configured to obtain subpixel-level positions of all sites uniformly distributed on the biochip by equal-size grids dividing method.

Another aspect of the present disclosure provides a gene sequencing instrument, including a processor and a memory storing one or more computer programs, which when executed by the processor, cause the processor to perform the above fluorescence image registration method.

Another aspect of the present disclosure provides a nonvolatile storage medium having computer instructions stored thereon. When the computer instructions are executed by a processor, the processor is configured to perform the above fluorescence image registration method.

SYMBOL DESCRIPTION OF MAIN COMPONENTS

Figure 1:
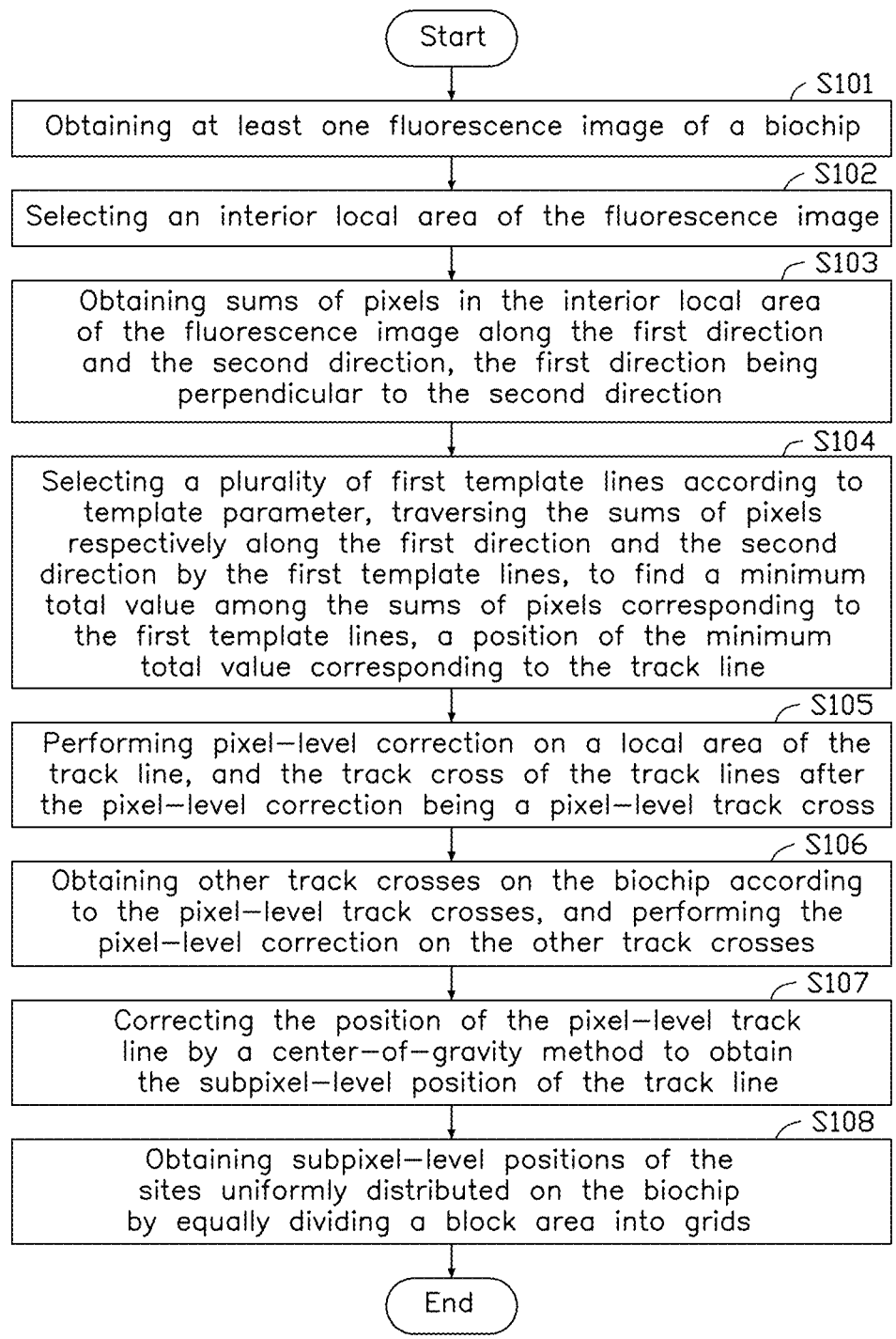
FIG. 1 is a flowchart of an embodiment of a fluorescent image registration method according to the present disclosure.

Gene sequencing instrument 1
Memory 10
Display 20
Processor 30
Image obtaining module 11
Area selecting module 12
Sum of pixel values obtaining module 13
Minimum total value finding module 14
Pixel-level correcting module 15
Other track cross obtaining module 16
Center-of-gravity correcting module 17
Subpixel-level site obtaining module 18

Implementations of the present technology will now be described, by way of example only, with reference to the attached figures.

DETAILED DESCRIPTION

In order to be able to understand the object, features and advantages of the embodiments of the present disclosure, implementations of the disclosure will now be described, by way of embodiments only, with reference to the drawings. It should be noted that non-conflicting details and features in the embodiments of the present disclosure may be combined with each other.

In the following description, specific details are explained in order to make the embodiments of the present disclosure understandable. The described embodiments are only a portion of, rather than all of the embodiments of the present disclosure of them. Based on the embodiments of the present disclosure, other embodiments obtained by a person of ordinary skill in the art without creative work shall be within the scope of the present disclosure.

Unless otherwise defined, all technical terms used herein have the same meaning as commonly understood by one of ordinary skill in the art. The technical terms used herein are not to be considered as limiting the scope of the embodiments.

FIG. 1 is a flowchart of an embodiment of a fluorescent image registration method according to the present disclosure. Referring to FIG. 1, the fluorescence image registration method may include following steps.

S101: at least one fluorescence image of a biochip is obtained.

In one embodiment, the biochip may be a gene sequencing chip. The fluorescence image may be a fluorescence signal image captured during a sequencing process. During the sequencing process, a microscope camera can be used to capture the fluorescent signal image of the biochip. A field of view of the microscope camera is small, substantially 768.6 μm×648 μm. The microscope camera can capture hundreds of fields of view (FOV) for the biochip. An area between two adjacent horizontal track lines and two adjacent vertical track lines in each field of view is defined as a block. The block can be an inner block or an outer block. Each block of the biochip includes a number of uniformly distributed sites. The sites can absorb DNA nanoball (DNB) molecules. The DNA nanoball molecules can be amplified products including DNA fragments. The DNA nanoball molecule carries fluorescent groups when the base is synthesized. The fluorescent groups can emit fluorescent signals when excited. A portion of the sites are arranged according to a preset rule to form a first set of track lines parallel to each other along a first direction and a second set of track lines parallel to each other along a second direction. The first direction may be a horizontal direction, and the second direction may be a vertical direction. Intersections between the first set of track lines and the second set of track lines are referred to as "track crosses".

S102: an interior local area of the fluorescence image is selected.

In one embodiment, the fluorescent groups can be fixed on the biochip according to a preset rule. Through a special design and process, some positions on the biochip are free of sites, that is, no fluorescent groups are formed at these positions. When the fluorescent groups are bright at random positions greater than 25% (four bases including adenine (A), thymine (T), cytosine (C), and guanine (G) are balanced), non-luminous boundary lines are highlighted. Each highlighted boundary line may be composed of three positions of fluorescent groups. The fluorescent groups in the center row are bright, and the fluorescent groups on both sides of the center row are not bright. The fluorescent groups in the center row form a track line, and the fluorescent groups on both sides of the center row form a dark line. Thus, the highlighted boundary line may include the track line and dark lines on both sides of the track line. Distortion in imaging can be ignored at the area of the dark lines.

In one embodiment, an area of 80% of the width along the first direction and 10% of the length along the second direction of the fluorescence image may be selected as the interior local area of the fluorescence image. The interior local area of the fluorescence image may include at least one track line along each of the first direction and the second direction.

S103: sums of pixel values in the interior local area of the fluorescence image along the first direction and the second direction are obtained. The first direction is perpendicular to the second direction.

In the embodiment, obtaining the sums of pixel values in the interior local area of the fluorescence image along the first direction and the second direction may include steps of selecting a number of second template lines, and such number may also be one only. The second template lines are moved in the interior local area of the fluorescent image respectively along the first direction and the second direction. A sum of pixel values in grayscale in the interior local area of the fluorescent image covered by the second template lines is calculated. That is, the sum of pixel values in grayscale is a sum of the gray values of the pixels covered by the second template lines. After moving the second template lines on the interior local area of the fluorescence image respectively along the first direction and the second direction, the sums of pixel values in the interior local area of the fluorescence image respectively along the first direction and the second direction can be obtained. The boundary line corresponds to a position of a lowest value among the sums of pixel values. In the present disclosure, the sum of pixel values in grayscale is referred to as the "sum of pixel values" for simplicity.

S104: a number of first template lines are selected according to template parameter. The first template lines traverse the sums of pixel values respectively along the first direction and the second direction, to find a minimum total value of the sums of pixel values corresponding to the first template lines. A position of the minimum total value corresponds to a position of the track line.

In the embodiment, the first template lines are selected according to the template parameter, and there may be three first template lines. The template parameter requires that a pixel distance between two first template lines is constant. The pixel distance between each two first template lines may be the same or different. The sums of pixel values of the interior local area of the fluorescence image along the first direction and the second direction are sequentially searched by the selected first template lines, to find the total value of the sums of pixel values corresponding to the first template lines. It can be understood that when all of the first template lines are located near the position of the minimum sums of pixel values, the total value of the sums of pixel corresponding to the first template lines is the minimum. The position of the minimum total value corresponds to the track line. The position of the track line obtained at this time is an approximate position of the track line. The template parameter in the present disclosure indicates the parameter for designing the biochip.

S105: pixel-level correction is performed on a local area of each track line. The track cross of the track lines after the pixel-level correction is a pixel-level track cross.

In the embodiment, the sums of pixel values of the local area of the track line along the first direction and the second direction are respectively obtained. Taking the vertical direction as an example, a number of third template lines spaced apart from each other by a predetermined distance are selected, to find the sums of pixel values of the local area of the track line by traversal. The sums of pixel values of the local area of the track line include a line which is a "W" in shape. Two valleys in the W-shaped line correspond to the dark lines on both sides of the track line, and the sum of pixel values of the dark lines are the lowest in value. The middle peak in the W-shaped line corresponds to the track line, and the sum of pixel values of the track line are the highest in value. A minimum total value of the sums of pixel values corresponding to the third template lines spaced apart from each other by the predetermined distance is obtained. The minimum total value of the sum of pixel values corresponding to the third template lines corresponds to one valley of the W-shaped line. Since the pixel distance between the valley and the peak is constant, the position of the peak can be obtained according to the position of the valley. It is understandable that the position of the peak corresponds to the position of the track line, so the pixel-level position of the track line can be obtained according to the position corresponding to the minimum total value. The track cross of the track line for pixel-level correction is the pixel-level track cross. It should be understood that the track cross is a virtual point. That is, actual site is not necessarily set at the position of this point, and the site does not necessarily emit light. The first template line, the second template line, and the third template line do not actually exist, but are virtual lines to facilitate the description of the present disclosure.

S106: other track crosses on the biochip are obtained according to the pixel-level track crosses, and the pixel-level correction is performed on the other track crosses.

In the embodiment, some of the sites are arranged on the biochip according to the preset rule, to form the first set of track lines parallel to each other along the first direction and the second set of track lines parallel to each other along the second direction. It can be understood that the arrangement between the first set of track lines and the second set of track lines is regular, and the arrangement of the track crosses is also regular. When the pixel-level position of the track crosses is known, the approximate position of the other track crosses on the biochip can be obtained according to the rules. Then, the pixel-level correction is performed on the other track crosses to obtain the pixel-level position of the other track crosses.

S107: the position of the pixel-level track line is corrected by a center-of-gravity method to obtain the subpixel-level position of the track line.

In the embodiment, taking the vertical direction as an example, a local area of the pixel-level track line is obtained. An area with a width of 3 pixels and a length of 50 pixels can be selected as the local area of the pixel-level track line. The center of gravity of the local area of the pixel-level track line is obtained. The track line passing through the center of gravity along the vertical direction is a subpixel-level track line, that is, the subpixel-level position of the track line is obtained according to the center of gravity. Similarly, the subpixel-level position of the track line along the horizontal direction is obtained, and the track cross of the subpixel-level track lines is the subpixel-level track cross.

S108: subpixel-level positions of the sites uniformly distributed on the biochip are obtained by equal-size grids dividing method.

In the embodiment, the block area formed by the track crosses of two adjacent subpixel-level track lines along the first direction and the second direction is obtained. The sites are arranged on the block area according to a preset rule. The subpixel-level position of all the sites on the block area can be obtained by equal-size grids dividing method.

In the fluorescence image registration method of the present disclosure, at least one fluorescence image of the biochip is obtained. The interior local area of the fluorescence image is selected. Sums of pixel values in the interior local area of the fluorescence image along the first direction and the second direction are obtained. A number of first template lines are selected according to template parameter. The first template lines traverse the sums of pixel values along the first direction and the second direction, to find the minimum total value of the sums of pixel values corresponding to the first template lines. The position of the minimum total value corresponds to the position of the track line. The pixel-level correction is performed on a local area of each track line. The track cross of the track lines after the pixel-level correction is the pixel-level track cross. Other track crosses on the biochip are obtained according to the pixel-level track crosses, and the pixel-level correction is performed on the other track crosses. The position of the pixel-level track line is corrected by the center-of-gravity method to obtain the subpixel-level position of the track line. Subpixel-level positions of the sites uniformly distributed on the biochip are obtained by equal-size grids dividing method. With the embodiment of the present disclosure, the positioning and registration operation of the fluorescent group in the fluorescent image can be optimized.

The above description explains the method provided by the present disclosure. The following explains an embodiment of the gene sequencing instrument or device according to the present disclosure.

An embodiment of the present disclosure provides a gene sequencing instrument, which includes a memory, a processor, and a computer program stored in the memory and executed by the processor. The processor executes the program to perform the steps of the fluorescence image registration method. It should be noted that the gene sequencing instrument may include a chip platform, an optical system, and a liquid path system. The chip platform can support the biochip. The optical system can capture the fluorescence images. The liquid path system can perform biochemical reactions using preset reagents.

Figure 2:
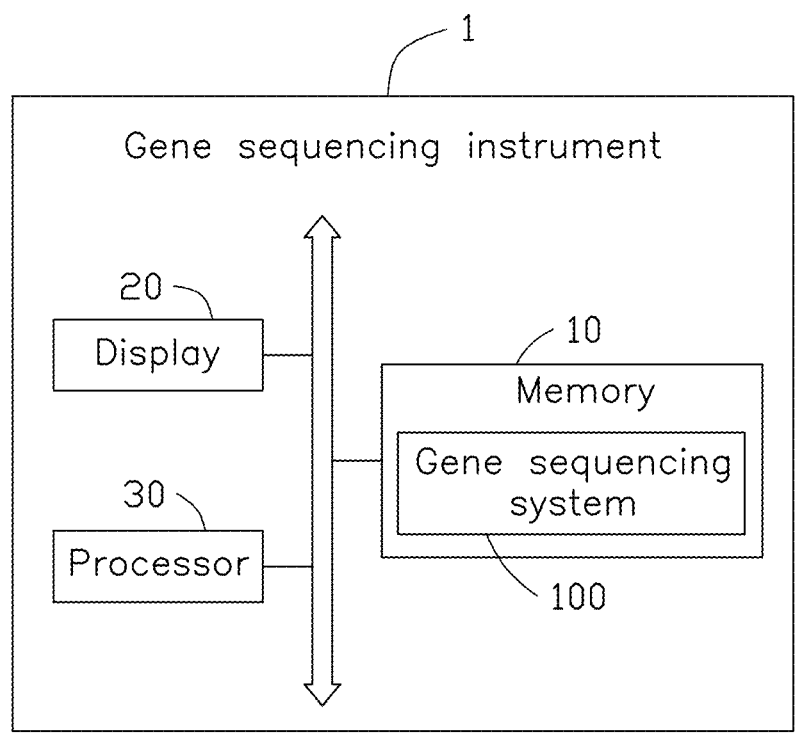
FIG. 2 is a diagrammatic view of an embodiment of a gene sequencing instrument according to the present disclosure.

FIG. 2 is a diagram of an embodiment of the gene sequencing instrument according to the present disclosure. Referring to FIG. 2, the gene sequencing instrument 1 includes a memory 10 for storing a gene sequencing system 100. The gene sequencing system 100 can obtain at least one fluorescence image of the biochip. The interior local area of the fluorescence image is selected. Sums of pixel values in the interior local area of the fluorescence image along the first direction and the second direction are obtained. A number of first template lines are selected according to template parameter. The first template lines traverse the sums of pixel values along the first direction and the second direction respectively, to find the minimum total value of the sums of pixel values corresponding to the first template lines. The position of the minimum total value corresponds to the track line. The pixel-level correction is performed on a local area of each track line. The track cross of the track lines after the pixel-level correction is the pixel-level track cross. Other track crosses on the biochip are obtained according to the pixel-level track crosses, and the pixel-level correction is performed on the other track crosses. The position of the pixel-level track line is corrected by the center-of-gravity method to obtain the subpixel-level position of the track line. Subpixel-level positions of the sites uniformly distributed on the biochip are obtained by equal-size grids dividing method. The positioning and registration of the fluorescent groups in the fluorescent images are optimized in the present disclosure.

In the embodiment, the gene sequencing instrument 1 may also include a display screen 20 and a processor 30. The memory 10 and the display screen 20 may be electrically connected to the processor 30.

The memory 10 may be any different type of storage device for storing various data. For example, the memory 10 can be a memory or an internal storage of the gene sequencing instrument 1. The memory 10 can also be a memory card that can be connected to the gene sequencing instrument 1, such as a flash memory, a SM card (Smart Media Card), or a SD card (Secure Digital Card, Secure digital card). In addition, the memory 10 may include a high-speed random access memory, and may also include a non-volatile memory, such as a hard disk, a memory, a plug-in hard disk, a smart memory card (Smart Media Card, SMC), a Secure Digital (SD) Card, a Flash Card, at least one magnetic disk storage device, a flash memory device, or other volatile solid-state storage device. The memory 10 can store various types of data, for example, various types of applications installed in the gene sequencing instrument 1, and the data for setting or the data obtained from the above fluorescence image registration method.

The display screen 20 is installed in the gene sequencing instrument 1 for displaying information.

The processor 30 can execute the fluorescence image registration method and various software installed in the gene sequencing instrument 1, such as an operating system and application/display software. The processor 30 includes, but is not limited to, a processor (Central Processing Unit, CPU), a Micro Controller Unit (Micro Controller Unit, MCU), and other devices for interpreting computer instructions and processing data in computer software.

The gene sequencing system 100 may include one or more modules. The one or more modules are stored in the memory 10 of the gene sequencing instrument 1, and can be executed by one or more processors (that is, the processor 30 in the embodiment) to complete the embodiment of the present disclosure. For example, referring to FIG. 3, the gene sequencing system 100 may include an image obtaining module 11, an area selecting module 12, a sum of pixel values obtaining module 13, a minimum total value obtaining module 14, a pixel-level correcting module 15, another track cross obtaining module 16, a center-of-gravity correcting module 17, and a subpixel-level site obtaining module 18. The modules referred to in the embodiment of the present disclosure may be program segments that complete a specific function. The module is more suitable than a program to describe the execution of software in the processor.

Figure 3:
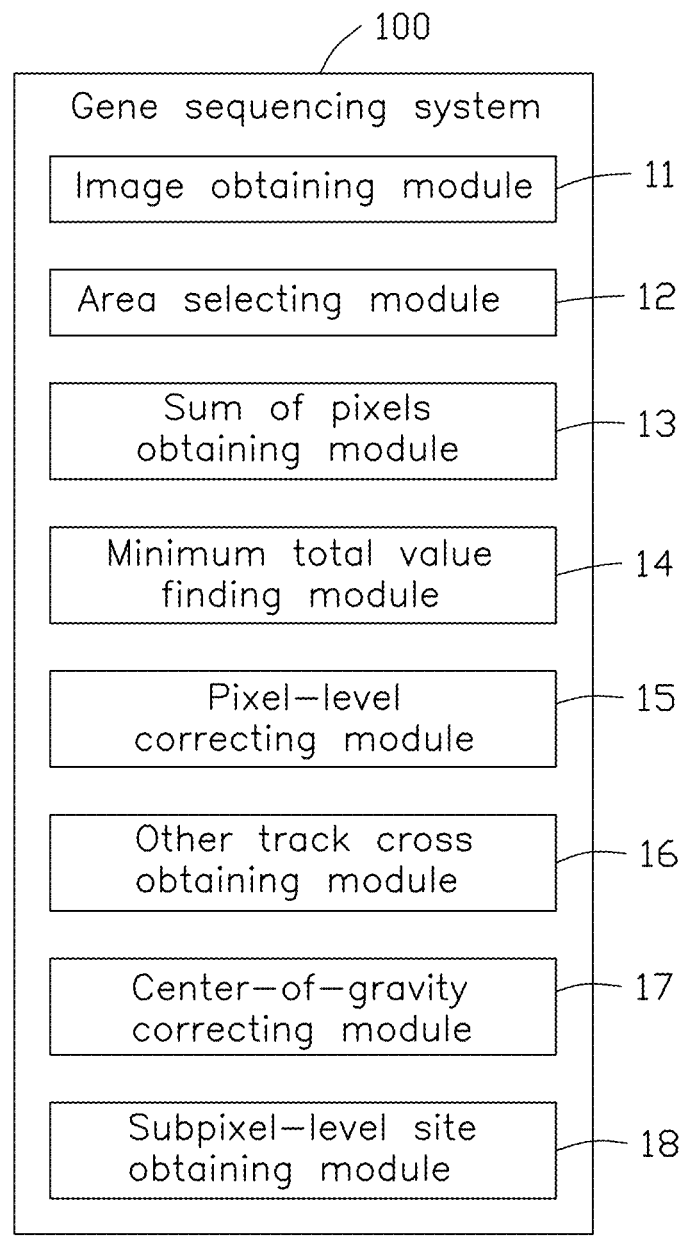
FIG. 3 is an exemplary block diagram of the gene sequencing instrument of FIG. 2.

It is understandable that based on each embodiment of the above fluorescent image registration method, the gene sequencing instrument 1 may include some or all of the modules shown in FIG. 3. Functions of each module are as follows. It should be noted that same nouns and related explanations in the above embodiments of the fluorescence image registration method can also be applied to the following functional introduction of each module. They are not repeated here in the interests of brevity and to avoid repetition.

The image obtaining module 11 is configured to obtain at least one fluorescence image of a biochip.

The area selecting module 12 is configured to select an interior local area of the fluorescence image.

The sum of pixel values obtaining module 13 is configured to obtain sums of pixel values in the interior local area of the fluorescence image along the first direction and the second direction. The first direction is perpendicular to the second direction.

The minimum total value finding module 14 is configured to select a number of first template lines according to template parameter. The first template lines traverse the sums of pixel values along the first direction and the second direction respectively, to find a minimum total value of the sums of pixel values corresponding to the first template lines. A position of the minimum total value corresponds to a position of the track line.

The pixel-level correcting module 15 is configured to perform pixel-level correction on a local area of each track line. The track cross of the track lines after the pixel-level correction is a pixel-level track cross.

The other track cross obtaining module 16 is configured to obtain other track crosses on the biochip according to the pixel-level track crosses, and perform a pixel-level correction on the other track crosses.

The center-of-gravity correcting module 17 is configured to correct the position of the pixel-level track line by a center-of-gravity method to obtain the subpixel-level position of the track line.

The subpixel-level site obtaining module 18 is configured to obtain subpixel-level positions of the sites uniformly distributed on the biochip by equal-size grids dividing method.

The present disclosure further provides an embodiment of a non-volatile computer-readable storage medium on which a computer program is stored. The steps of the fluorescence image registration method in any above embodiment are performed when the computer program is executed by a processor.

If the gene sequencing system, the gene sequencing instrument, and the modules/units integrated in a computer equipment are implemented in form of software functional units and sold or used as independent products, they can be stored in a computer readable storage medium. Based on this, part or all of the steps of the above method and can also be completed through a computer program instructed by relevant hardware. The computer program can be stored in a computer-readable storage medium. The steps of the above method can be performed when the program is executed by the processor. The computer program includes computer program code, which is in form of source code, object code, executable file, or some intermediate forms. The computer-readable storage medium may include any entity or device capable of carrying the computer program code, recording medium, U disk, mobile hard disk, magnetic disk, optical disk, computer memory, read-only memory (ROM), Random Access Memory (RAM), electrical carrier signal, telecommunications signal, and software distribution media.

The processor can be a central processing unit (Central Processing Unit, CPU), or another general-purpose processor, digital signal processor (Digital Signal Processor, DSP), application specific integrated circuit (ASIC), ready-made Field-Programmable Gate Array (FPGA), or other programmable logic device, discrete gate, transistor logic device, or discrete hardware component. The general-purpose processor can be a microprocessor or any conventional processor. The processor is the control center of the gene sequencing system and the gene sequencing instrument. Various interfaces and lines are used to connect different parts of the entire gene sequencing system/gene sequencing instrument together.

The memory can store the computer program and/or the modules. The processor can run or execute the computer program and/or the modules stored in the memory, and also call the data stored in the memory, to perform the functions of the gene sequencing system/gene sequencing instrument. The memory may include a program storage area and a data storage area. The program storage area may store an operating system, an application program required by at least one function (such as a sound playing function, an image displaying function, etc.). In addition, the memory can include a high-speed random access memory, and can also include a non-volatile memory, such as hard disk, memory, plug-in hard disk, smart media card (SMC), Secure Digital (SD) card, Flash Card, at least one magnetic disk storage device, flash memory device, or another volatile solid-state storage device.

Figure 4A:
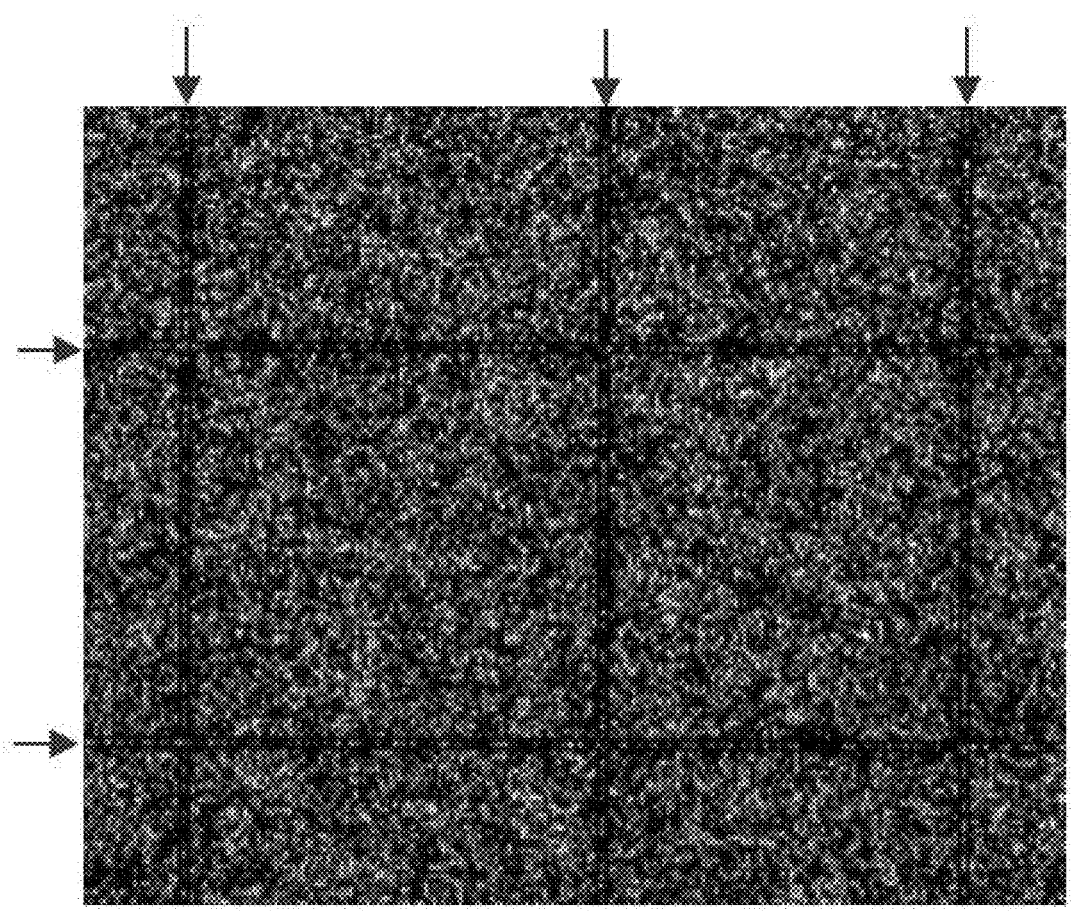
FIG. 4A is a diagram of an embodiment of a portion of a fluorescence image according to the present disclosure.
Figure 4B:
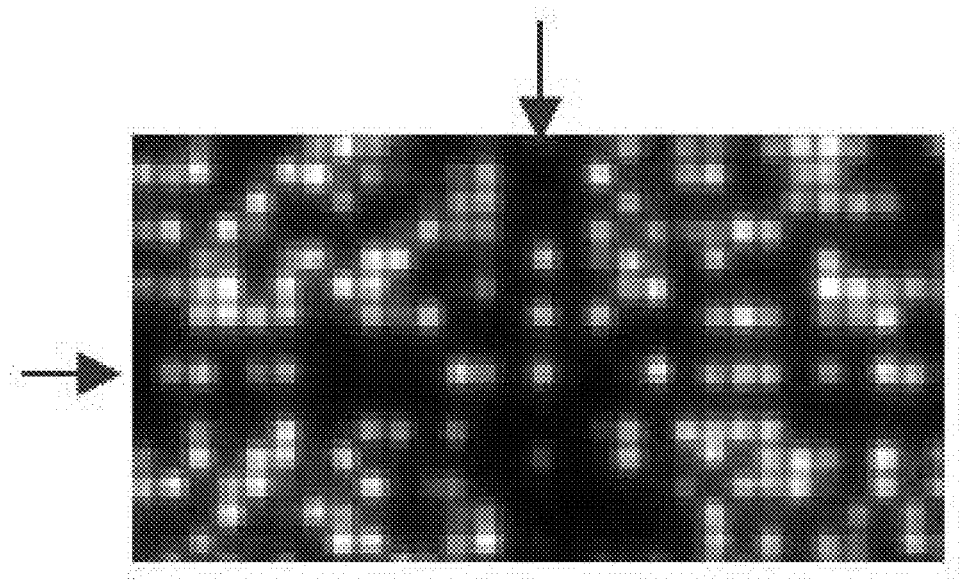
FIG. 4B is an enlarged diagram of a portion of FIG. 4A.

Referring to FIG. 4A and FIG. 4B, FIG. 4A is a diagram of an embodiment of a portion of a fluorescence image according to the present disclosure. FIG. 4B is an enlarged diagram of a portion of FIG. 4A. The fluorescent groups are distributed on the biochip according to a preset rule. Through a special design and process, no fluorescent groups are formed at some positions on the biochip. As shown in FIG. 4A, when the fluorescent groups are bright at random positions greater than 25% (four bases are balanced), the non-luminous boundary line is highlighted. Referring to FIG. 4A, two boundary lines are along the horizontal direction (the black arrow points to the position of the boundary line), and the three boundary lines are along the vertical direction. The boundary lines along the horizontal and vertical directions are enlarged as shown in FIG. 4B. Taking the vertical direction as an example, each highlighted boundary line can be composed of three positions of fluorescent groups. The fluorescent groups in the center row are bright, and the fluorescent groups on both sides of the center row are not bright. The fluorescent groups in the center row form the track line, and the fluorescent groups on both sides of the center row form the dark line. It is understandable that the highlighted boundary line may include the track line and dark lines on both sides of the track line. Reference to the biochemical array chip disclosed in PCT patent application PCT/US2011/050047 will provide a better understanding of the layouts of the sites and the track lines on the biochip.

Figure 5A:
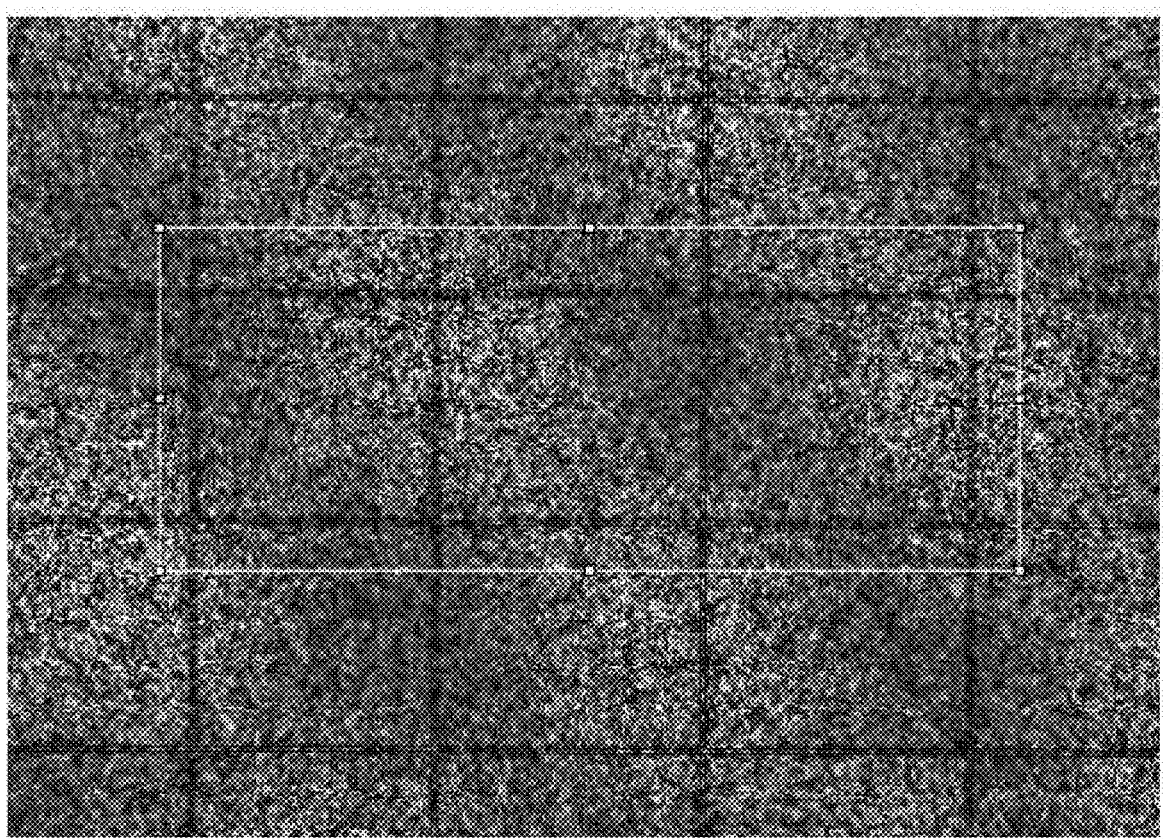
FIG. 5A is a diagram of an embodiment of an interior local area of a fluorescence image according to the present disclosure.
Figure 5B:
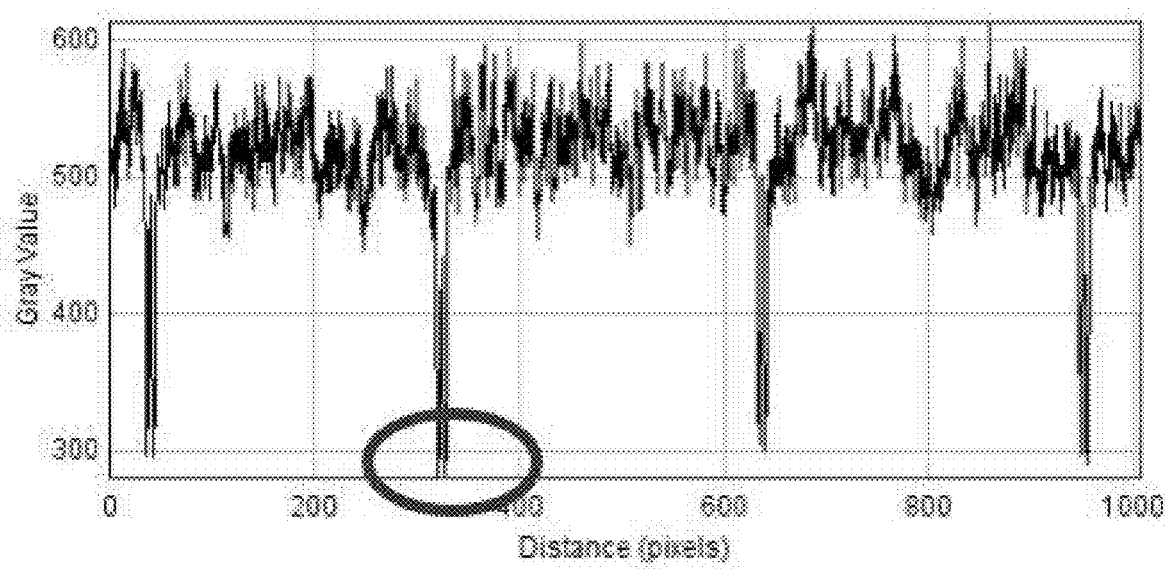
FIG. 5B is a diagram showing sums of pixel values along a vertical direction of the interior local area of FIG. 5A.

Referring to FIG. 5A and FIG. 5B, FIG. 5A is a diagram of an embodiment of an interior local area of a fluorescence image according to the present disclosure. FIG. 5B is a diagram showing sums of pixel values along a vertical direction of the interior local area of FIG. 5A. As shown in FIG. 5A, an area of 80% of the width along the first direction and 10% of the length along the second direction of the fluorescence image is selected as the interior local area of the fluorescence image (that is, a portion selected by the white rectangular frame). In the interior local area of the fluorescence image, four boundary lines along the vertical direction and two boundary lines along the horizontal direction are included. Taking the vertical direction as an example, the sums of pixel values of the interior local area of the fluorescence image along the vertical direction are calculated. As shown in FIG. 5B, the horizontal axis of FIG. 5B represents coordinates of the pixels in the interior local area of the fluorescent image on the biochip, and the vertical axis represents the sums of pixel values in grayscale. Four minimum sums of pixel values are included in FIG. 5B, which correspond to four boundary lines along the vertical direction in the interior local area of the fluorescence image. The position marked by the black ellipse mark is the second boundary line along the vertical direction in the interior partial area of the fluorescence image (in order from left to right) as shown in FIG. 5A.

Figure 6A:
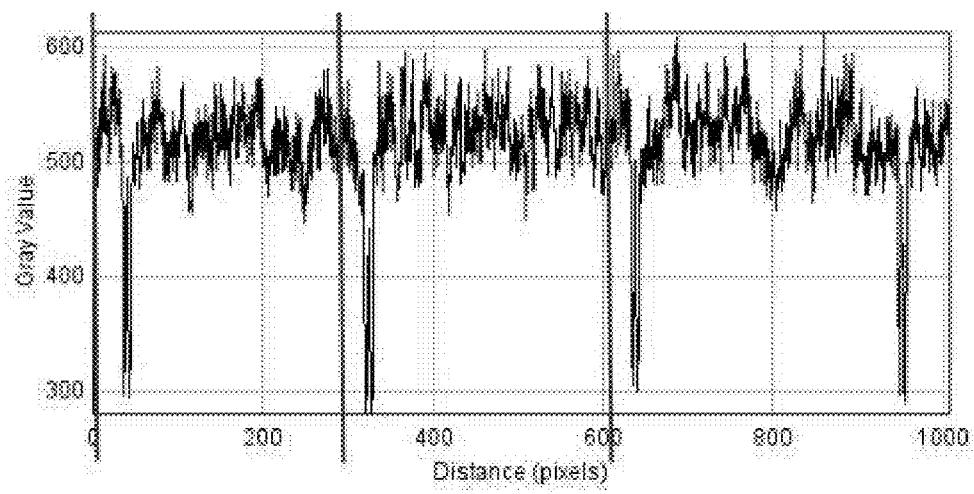
FIG. 6A is a diagram showing three first template lines searching for the sums of pixel values of FIG. 5B.
Figure 6B:
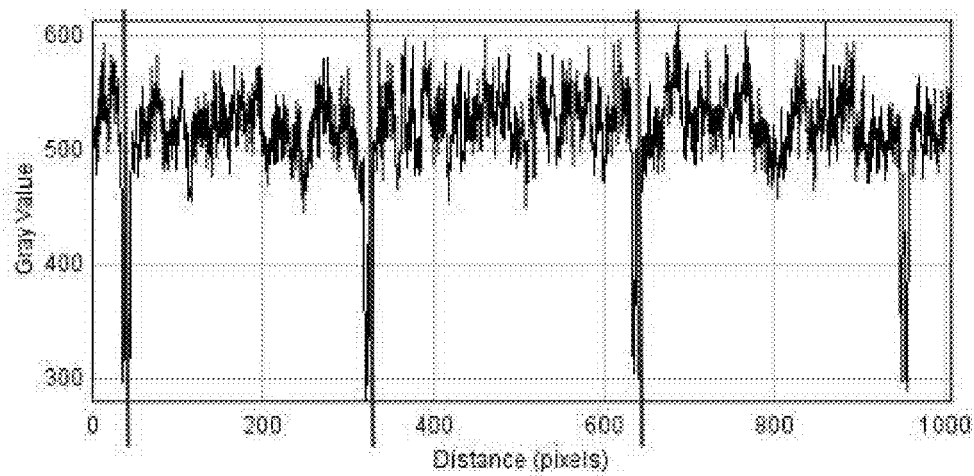
FIG. 6B is another diagram showing three first template lines searching for the sums of pixel values of FIG. 5B.
Figure 6C:
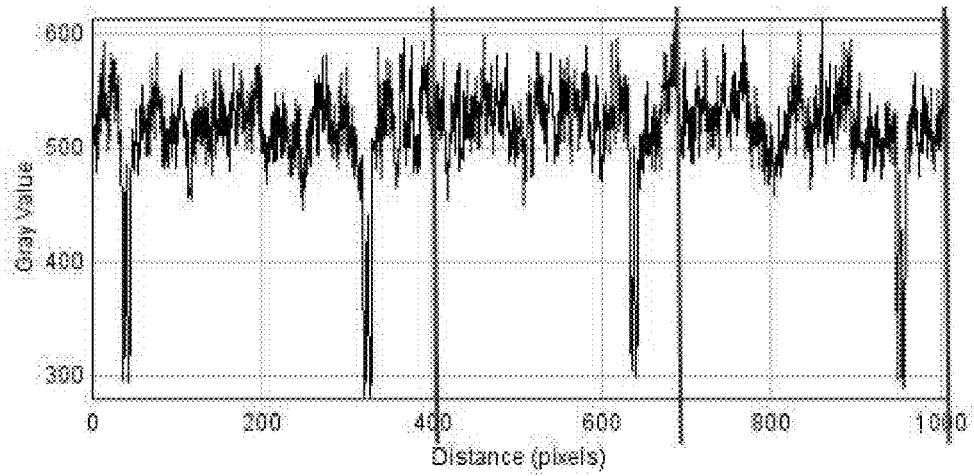
FIG. 6C is yet another diagram showing three first template lines searching for the sums of pixel values of FIG. 5B.

Referring to FIG. 6A, FIG. 6B, and FIG. 6C, FIG. 6A is a diagram showing three first template lines searching for the sums of pixel values of FIG. 5B. FIG. 6B is another diagram showing three first template lines searching for the sums of pixel values of FIG. 5B. FIG. 6C is yet another diagram showing three first template lines searching for the sums of pixel values of FIG. 5B. The sums of pixel values are sequentially searched by the three first template lines. The distance between each two first template lines is constant but different from each other. For example, the distance between the first template line and the second template line is smaller than the distance between the second first template line and the third first template line. As shown in FIG. 6A and FIG. 6C, the three first template lines are not at one time at the positions of the minimum sums of pixel values. As shown in FIG. 6B, the three first template lines are all at the positions of the minimum sums of pixel values (in order from left to right). At this time, the total value of the sums of pixel values of the three first template lines are minimal. The position of the minimum total value of the sum of pixel values is the approximate position of the track line. In relation to searching for the sums of pixel values in FIG. 5B by the three first template lines, it can be understood that the three virtual first template lines, with a fixed space therebetween, can be moved from left to right to press the curve of the sums of pixel values in FIG. 5B, the sums of pixel values being read (that is, traversed) by the three first template lines at the positions which are pressed. Then, the total value of the three sums of pixel values is calculated, and the total value is added to the diagram of FIG. 7. Each time the total value is obtained, the total value is added to the vertical ordinate corresponding to the position of the left first template line.

Figure 7:
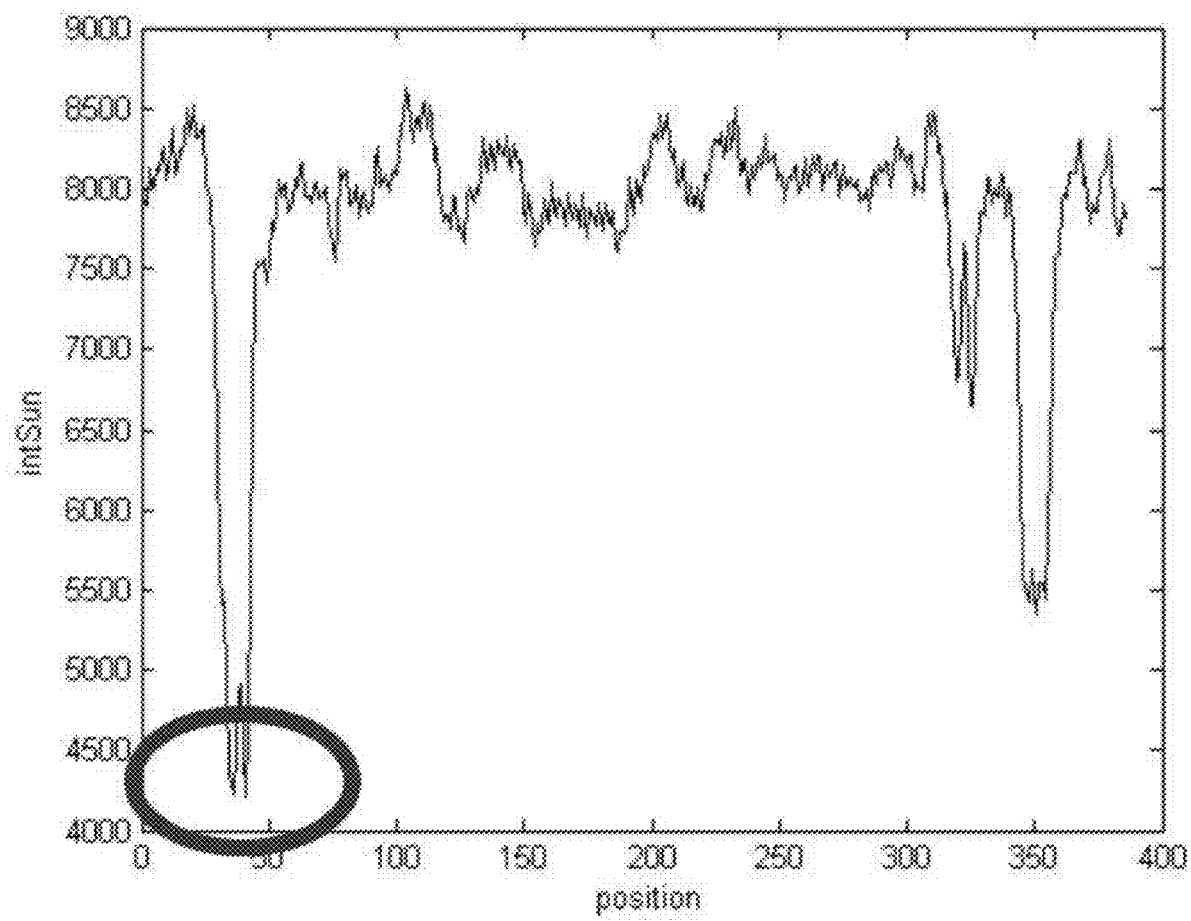
FIG. 7 is a diagram showing a total value of the sums of pixel values corresponding to the three first template lines.

Referring to FIG. 7, a total value of the sums of pixel values corresponding to the three first template lines is shown. As shown in FIG. 7, the black circle corresponds to the position where the total value of the sums of pixel values of the three first template lines is at a minimum. The position of the minimum total value corresponds to the approximate position of the track line.

Figure 8A:
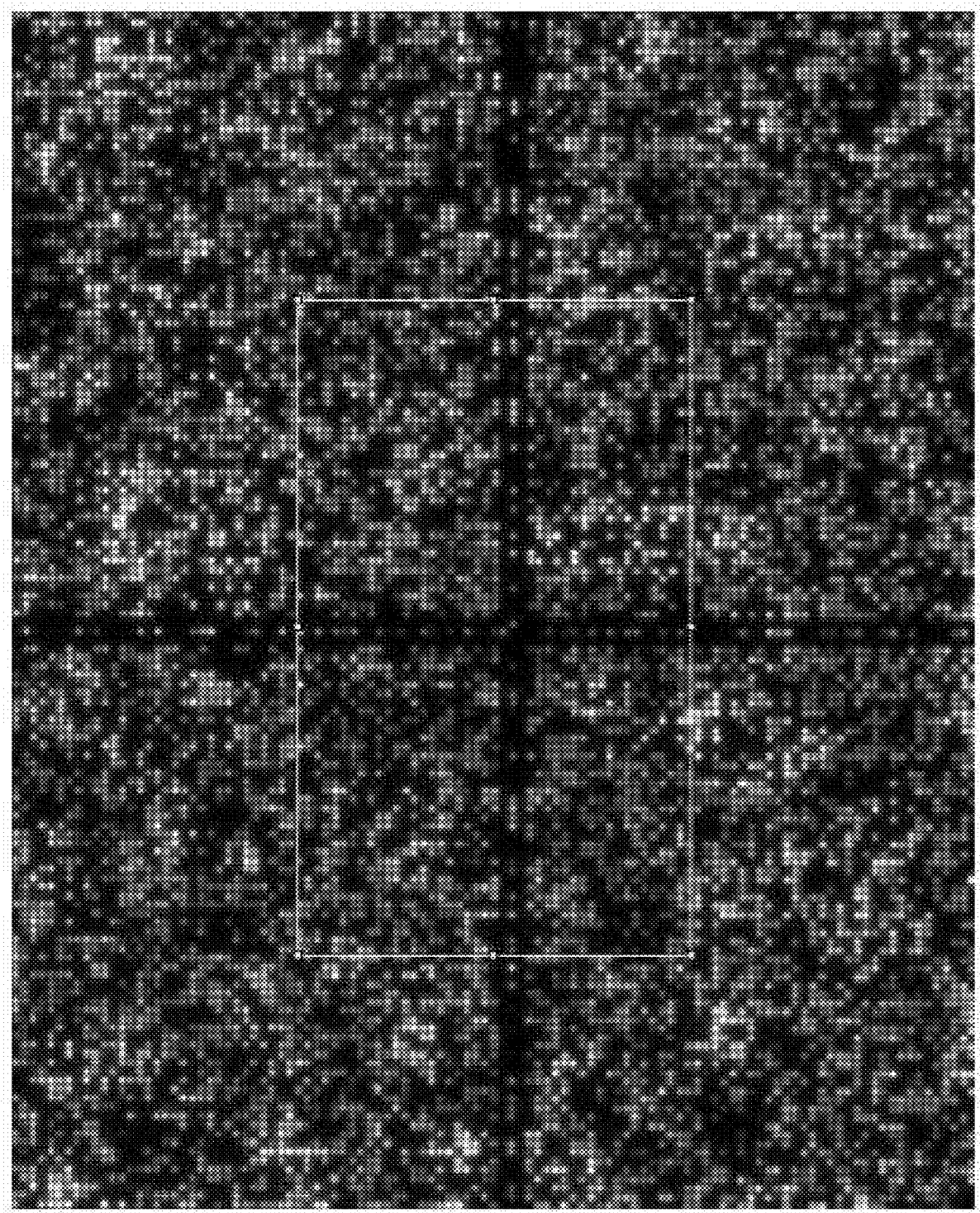
FIG. 8A is a diagram of a portion of a track line according to the present disclosure.
Figure 8B:
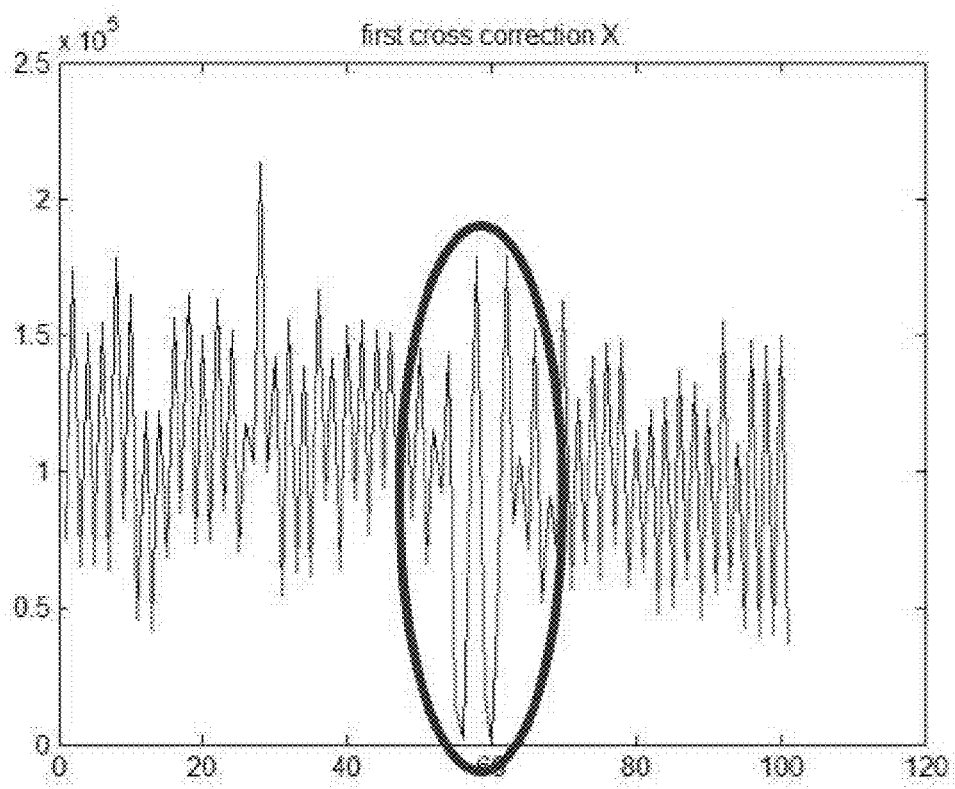
FIG. 8B is a diagram showing the sums of pixel values of the portion of the track line along the vertical direction.
Figure 8C:
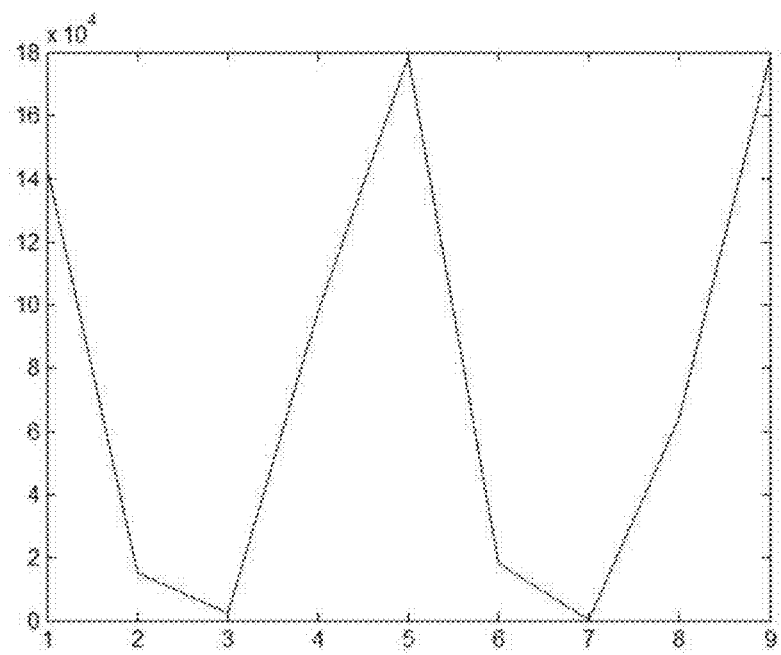
FIG. 8C is an enlarged diagram of the selected area of FIG. 8B.

Referring to FIGS. 8A, 8B, and 8C, FIG. 8A is a diagram of a portion of a track line according to the present disclosure. FIG. 8B is a diagram showing the sums of pixel values of the portion of the track line along the vertical direction. FIG. 8C is an enlarged diagram of the selected area of FIG. 8B. As shown in FIG. 8A, a local area of the track line is selected by the white rectangular frame, and is traversed to find the sums of pixel values of the local area of the track line along a single direction (that is, the horizontal or vertical direction). Taking the vertical direction as an example, as shown in FIG. 8B, the W-shaped line (selected by the black ellipse circle) is included in the sums of pixel values of the local area of the track line along the vertical direction. When the W-shaped line is enlarged, two valleys and one peak are included in the W-shaped line as shown in FIG. 8C. It is understandable that the two valleys correspond to the dark lines on both sides of the track line on the biochip, and the sum of pixel values of the dark lines are the lowest. The peak in the W-shaped line corresponds to the track line, and the sum of pixel values of the track line are the highest.

Figure 9:
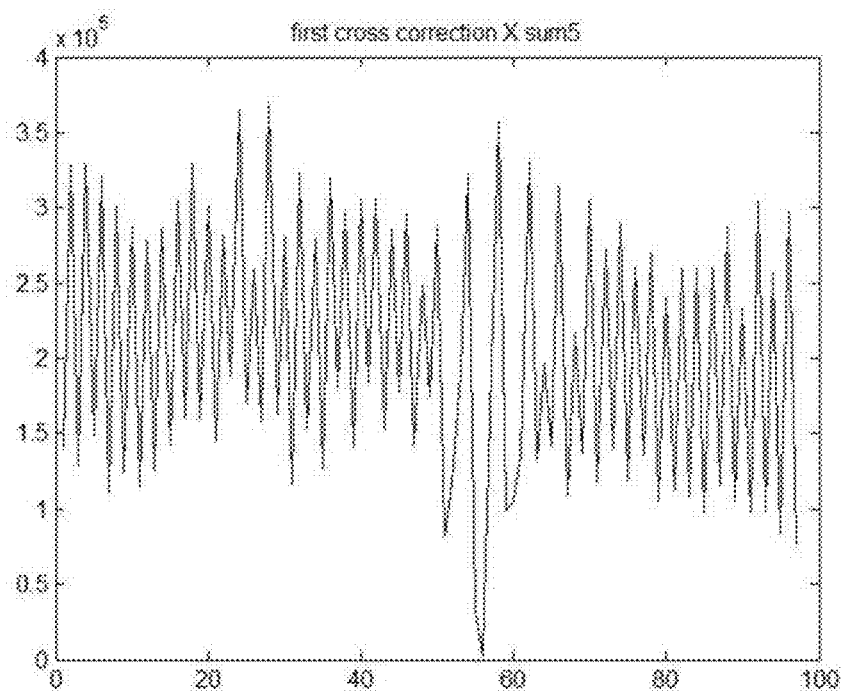
FIG. 9 is a diagram showing a total value obtained by the sums of pixel values of FIG. 8B.

Referring to FIG. 9, a total value obtained by the sums of pixel values of FIG. 8B is shown. For the sums of pixel values of the local area of the track line along the vertical direction as shown in FIG. 8B, two third template lines, with a preset distance of four, are selected to traverse the sums of pixel values of the local area of the track line. The distance of four is selected according to the template parameter of the biochip. The sums of pixel values corresponding to the two third template lines with the preset distance of four are obtained. The minimum sum of pixel values is then obtained. As shown in FIG. 9, the minimum sum of pixel values is between (40, 60) on the horizontal axis. The position of the minimum sum of pixel values corresponds to the pixel-level position of one valley of the W-shaped line. The pixel-level position of the track line can be obtained according to the pixel-level position of the valley.

Figure 10:
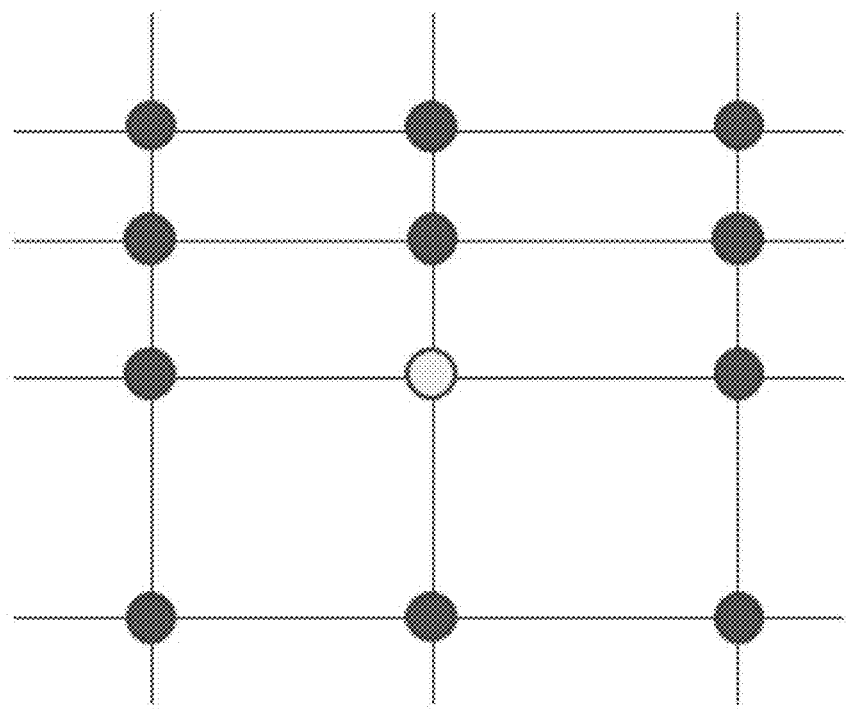
FIG. 10 is a diagram showing other track crosses derived by pixel-level track crosses according to the present disclosure.

Referring to FIG. 10, other track crosses derived by pixel-level track crosses according to the present disclosure are shown. As shown in FIG. 10, the light gray dots indicate the obtained pixel-level track crosses. The arrangement of the first set of track lines and the second set of track lines is regular on the biochip. The arrangement of the track crosses of the track lines is also regular. When the pixel-level position of the track crosses is obtained, the position of the other track crosses on the biochip can be obtained according to the corresponding rules (the dark gray dots indicate other track crosses). The obtained positions of the other track crosses are approximate positions, and pixel-level corrections need to be performed on the other track crosses to obtain the pixel-level positions of the other track crosses.

Figure 11A:
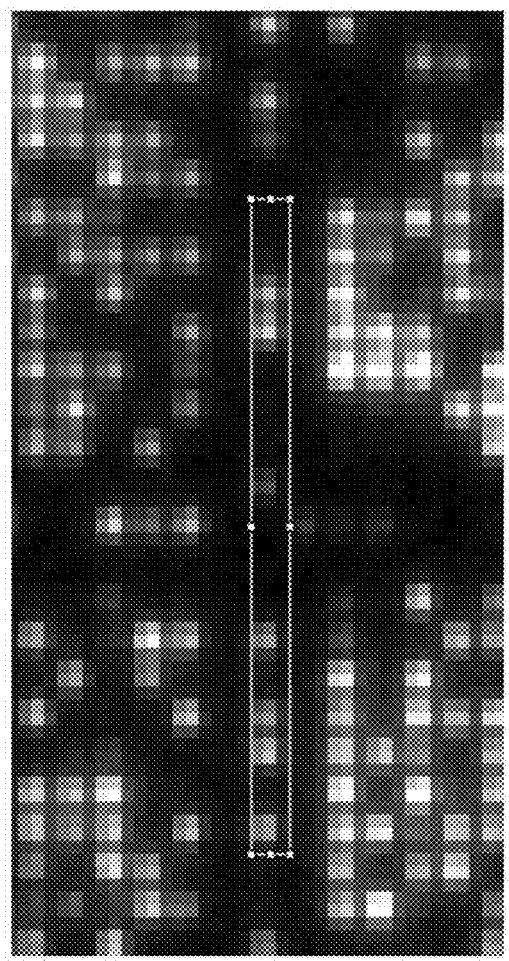
FIG. 11A is a diagram of a portion of a pixel-level track line.
Figure 11B:
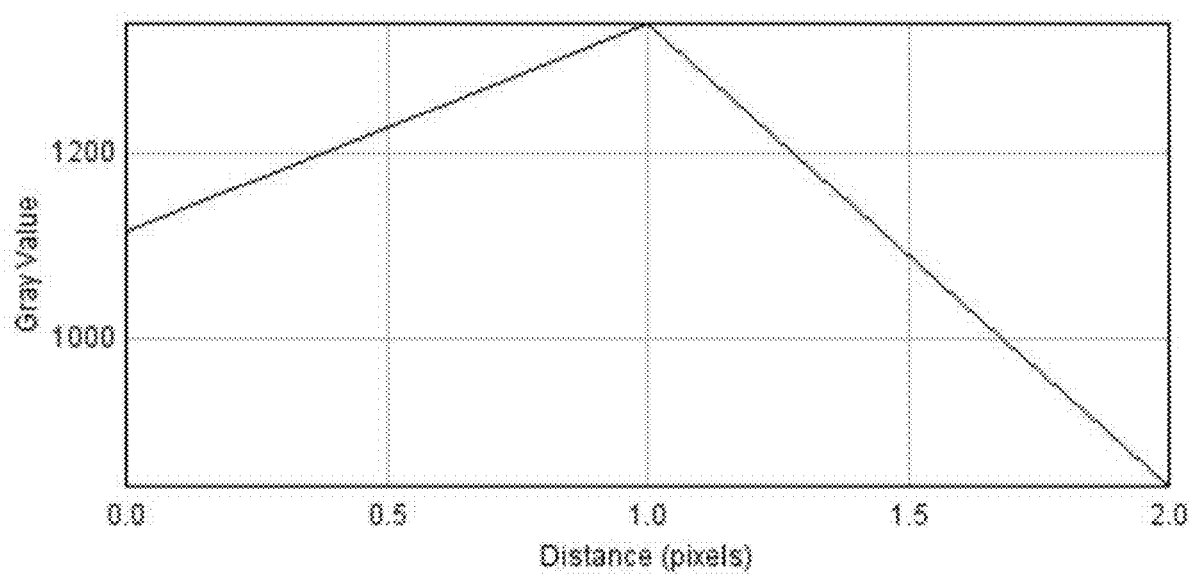
FIG. 11B is a diagram showing the sums of pixel values of the portion of the pixel-level track line along the horizontal direction.

Referring to FIGS. 11A and 11B, FIG. 11A is a diagram of a portion of a pixel-level track line. FIG. 11B is a diagram showing the sums of pixel values of the portion of the pixel-level track line along the horizontal direction. As shown in FIG. 11A, an area with a width of 3 pixels and a length of 50 pixels can be selected as the local area of the pixel-level track line (as selected by the white line). The center of gravity of the local area of the pixel-level track line is obtained. The track line passing through the center of gravity along the vertical direction is the subpixel-level track line. As shown in FIG. 11B, the horizontal axis represents the coordinates of the pixels in the local area of the pixel-level track line along the horizontal direction, and the vertical axis represents the sums of pixel values in grayscale. A coordinate interval of the horizontal axis is (0, 2). The sum of pixel values is maximum when the pixel coordinate is 1, and the sum of pixel values is zero when the pixel coordinate is 2. When the pixel coordinate is 0, the sum of pixel values is between (1000, 1200). Using the local area of the pixel-level track line shown in FIG. 11B, the approximate position of the center of gravity on the local area of the pixel-level track line can be determined. For example, the center of gravity is at a leftmost position of the local area of the pixel-level track line.

Figure 12A:
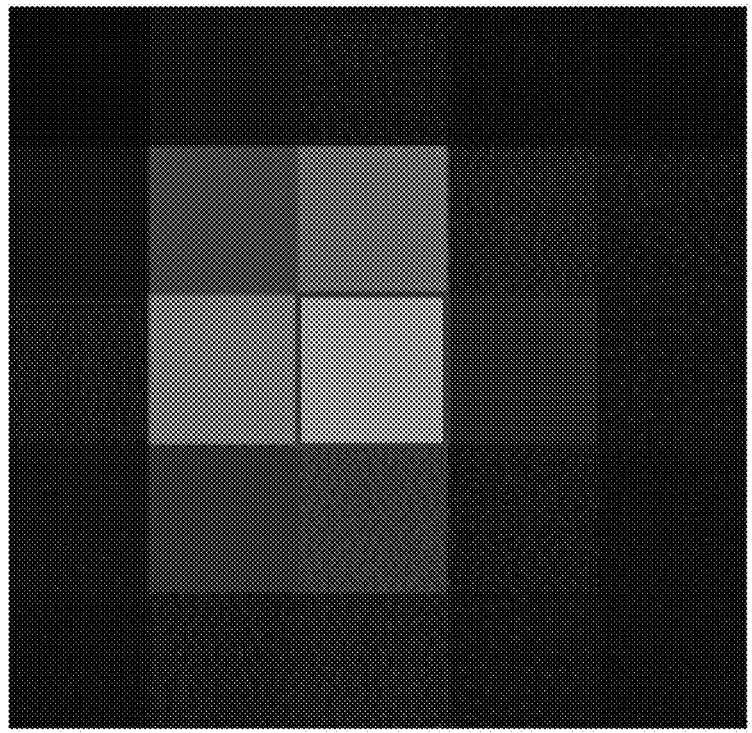
FIG. 12A is a diagram of positions of the pixel-level track line.
Figure 12B:
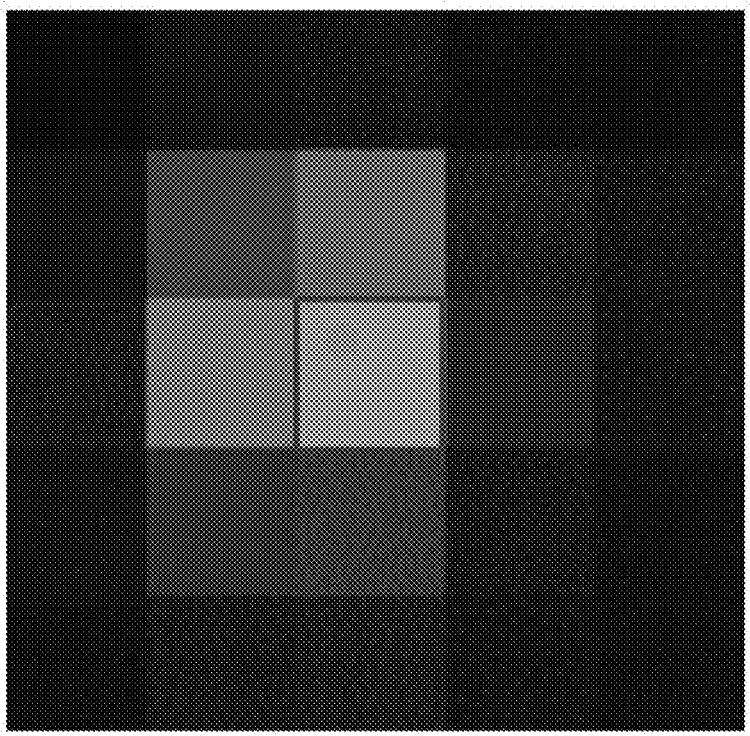
FIG. 12B is a diagram of positions of the subpixel-level track line.

Referring to FIGS. 12A and 12B, FIG. 12A is a diagram of positions of the pixel-level track line. FIG. 12B is a diagram of positions of the subpixel-level track line. As shown in FIG. 12A, the pixel-level position of a certain track line is selected by a black box. When the pixel is subdivided (the position of the pixel-level track line is corrected by the center-of-gravity method to obtain the subpixel-level position of the track line), the subpixel-level position is obtained, as shown in FIG. 12B. The light gray dot indicates the position of the center of gravity on the local area of the track line. It is understandable that the straight line passing through the black dot is the track line, and the track line is a subpixel-level track line.

Figure 13:
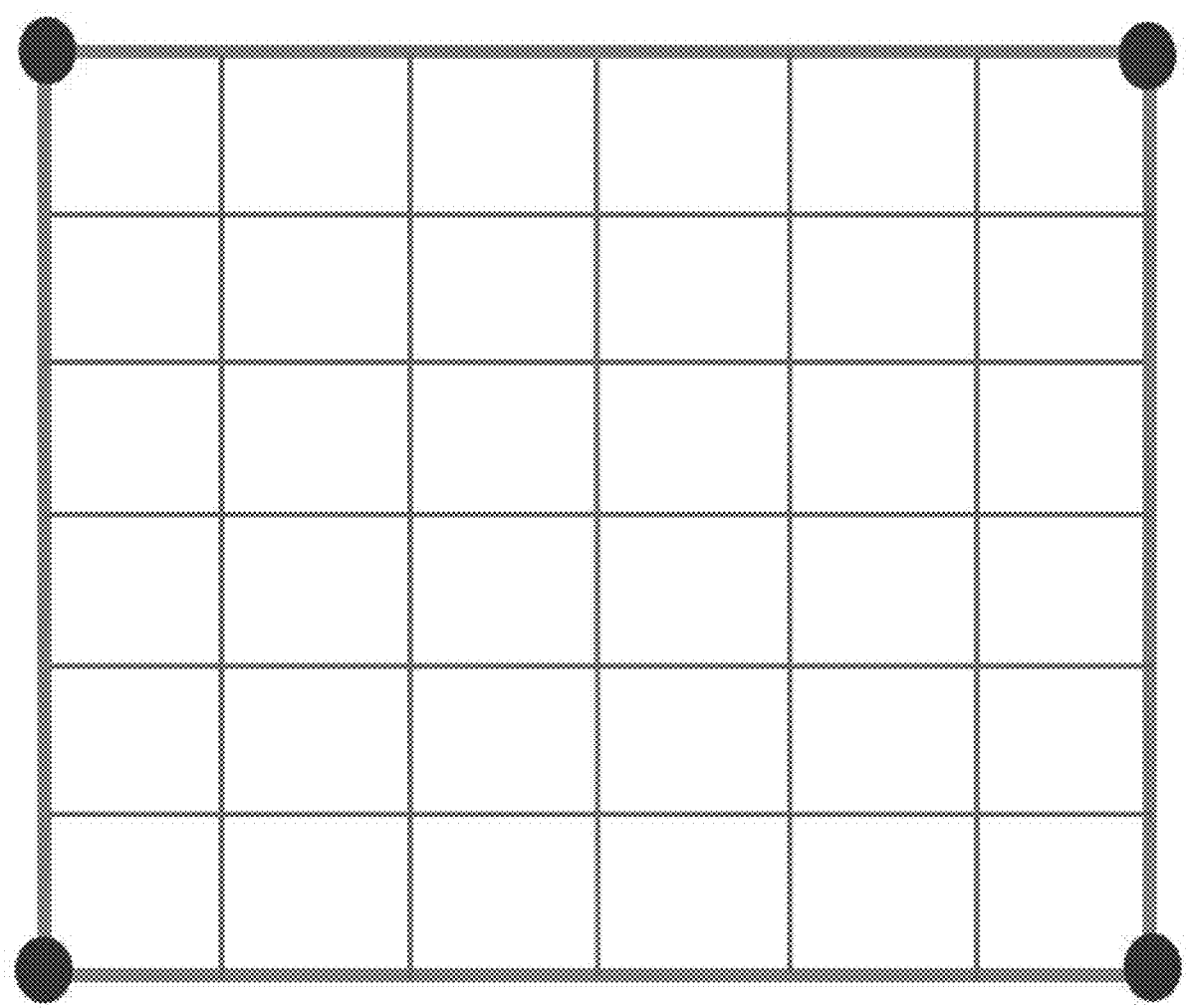
FIG. 13 is a diagram showing subpixel positions of sites obtained by equal-size grids dividing method.

FIG. 13 is a diagram showing subpixel positions of sites obtained by equal-size grids dividing method. Referring to the FIG. 13, the black circle indicates the track cross of the subpixel-level track line along the first direction and the subpixel-level track line along the second direction. The position of the track cross is a subpixel-level position. A block area between the track crosses of two adjacent subpixel-level track lines along the first direction and the second direction. The sites are arranged on the block area according to a preset rule. The subpixel position of the site on the block area can be obtained by equal-size grids dividing method.

In the various embodiments of the present disclosure, it should be understood that the terminal and the method may be implemented in other ways. For example, the system described above is only illustrative. The division of the modules is only based on logical function, and other methods of describing the modules may also be included in actual implementation.

For those skilled in the art, it is obvious that the embodiments of the present disclosure are not limited to the above details, and can also be implemented in other specific forms without departing from the spirit or basic characteristics of the embodiments of the present disclosure. Therefore, no matter from which point of view, the embodiments should be regarded as exemplary and non-limiting. The scope of the embodiments of the present disclosure is defined by the appended claims rather than the above description. Therefore, all changes within the meaning and scope of equivalent elements of the claims are included in the embodiments of the present disclosure. Any reference signs in the claims should not be regarded as limiting the claims. Multiple units, modules, or devices stated in the system, device, or terminal of the claims can also be implemented by the same unit, module, or device through software or hardware.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A fluorescence image registration method applied to a biochip, a pixel distance between track lines on the biochip being set according to template parameter, the fluorescence image registration method comprising:

obtaining at least one fluorescence image of the biochip;

selecting an interior local area of the fluorescence image by selecting an area of 80% of a width along a first direction and 10% of a length along a second direction of the fluorescence image as the interior local area, the first direction being perpendicular to the second direction;

obtaining sums of pixel values in the interior local area of the fluorescence image respectively along the first direction and the second direction, comprising: selecting a plurality of second template lines; moving the plurality of second template lines in the interior local area of the fluorescent image respectively along the first direction and the second direction; and calculating a sum of pixel values in grayscale in the interior local area of the fluorescent image covered by the plurality of second template lines, wherein the sum of pixel values in grayscale is a sum of the gray values of the pixels covered by the plurality of second template lines;

selecting a plurality of first template lines according to the template parameter, traversing the sums of pixel values respectively along the first direction and the second direction by the plurality of first template lines, to find a minimum total value of the sums of pixel values corresponding to the plurality of first template lines respectively along the first direction and the second direction, and a position of the minimum total value along the first direction or the second direction corresponding to a position of the track lines along the first direction or the second direction;

performing pixel-level correction on a local area of the track lines, and a track cross of the track lines after the pixel-level correction being a pixel-level track cross;

obtaining other track crosses on the biochip according to the pixel-level track crosses, and performing the pixel-level correction on the other track crosses;

correcting a position of a pixel-level track line by a center-of-gravity method to obtain a subpixel-level position of the track lines, wherein "correcting the position of the pixel-level track line by the center-of-gravity method" further comprises: selecting an area with a width of 3 pixels and a length of 50 pixels as a local area of the pixel-level track line; obtaining a center of gravity of the local area of the pixel-level track line; and obtaining a subpixel-level position of the track line according to the center of gravity; and obtaining subpixel-level positions of all sites uniformly distributed on the biochip by equal-size grids dividing method.

2. The fluorescence image registration method of claim 1, wherein "selecting the plurality of first template lines according to the template parameter, traversing the sums of pixel values respectively along the first direction and the second direction by the plurality of first template lines, to find the minimum total value of the sums of pixel values corresponding to the plurality of first template lines respectively along the first direction and the second direction" further comprises:

calculate a total value of the sums of pixel values respectively along the first direction and the second direction corresponding to the plurality of first template lines; and obtaining the minimum total value among the total value of the sums of pixel values.

3. The fluorescence image registration method of claim 2, wherein "performing the pixel-level correction on the local area of the track lines" further comprises:

obtaining the sums of pixel values of the local area of the track line along the first direction and the second direction respectively;

selecting a plurality of third template lines spaced apart from each other by a predetermined distance, to find the sums of pixel values of the local area of the track line by traversal;

obtaining a minimum total value of the sums of pixel values corresponding to the plurality of third template lines; and obtaining the pixel-level position of the track line according to a position corresponding to the minimum total value.

4. The fluorescence image registration method of claim 3, wherein "obtaining the pixel-level position of the track line according to the position corresponding to the minimum total value" further comprises:

obtaining a pixel-level position of a valley of W-shaped line according to the position of the minimum total value, wherein the sums of pixel values of the local area of the track line comprises the W-shaped line; and obtaining the pixel-level position of the track line according to the pixel-level position of the valley.

5. The fluorescence image registration method of claim 4, wherein the W-shaped line is provided with a peak and two valleys, a pixel distance between one of the two valleys and the peak is constant, and a pixel-level position of the peak is obtained according to the pixel-level position of the valley, and the peak in the W-shaped line corresponds to the track line.

6. The fluorescence image registration method of claim 1, wherein "obtaining the subpixel-level positions of all sites uniformly distributed on the biochip by equal-size grids dividing method" further comprises:

obtaining a block area formed by the track crosses of two adjacent subpixel-level track lines along the first direction and the second direction, wherein the sites are arranged on the block area according to a preset rule; and obtaining the subpixel-level position of all of the sites on the block area by the equal-size grids dividing method.

7. A gene sequencing instrument, comprising:

a processor; and a memory storing one or more computer programs, which when executed by the processor, cause the processor to execute following steps:

obtaining at least one fluorescence image of the biochip;

selecting an interior local area of the fluorescence image by selecting an area of 80% of a width along a first direction and 10% of a length along a second direction of the fluorescence image as the interior local area, the first direction being perpendicular to the second direction;

obtaining sums of pixel values in the interior local area of the fluorescence image respectively along the first direction and the second direction, comprising: selecting a plurality of second template lines; moving the plurality of second template lines in the interior local area of the fluorescent image respectively along the first direction and the second direction; and calculating a sum of pixel values in grayscale in the interior local area of the fluorescent image covered by the plurality of second template lines, the sum of pixel values in grayscale is a sum of the gray values of the pixels covered by the plurality of second template lines;

selecting a plurality of first template lines according to the template parameter, traversing the sums of pixel values respectively along the first direction and the second direction by the plurality of first template lines, to find a minimum total value of the sums of pixel values corresponding to the plurality of first template lines respectively along the first direction and the second direction, and a position of the minimum total value along the first direction or the second direction a position of the track line along the first direction or the second direction;

performing pixel-level correction on a local area of the track lines, and a track cross of the track lines after the pixel-level correction being a pixel-level track cross;

obtaining other track crosses on the biochip according to the pixel-level track crosses, and performing the pixel-level correction on the other track crosses;

correcting a position of a pixel-level track line by a center-of-gravity method to obtain a subpixel-level position of the track line, wherein "correcting the position of the pixel-level track line by the center-of-gravity method" further comprises: selecting an area with a width of 3 pixels and a length of 50 pixels as a local area of the pixel-level track line; obtaining a center of gravity of the local area of the pixel-level track line; and obtaining a subpixel-level position of the track line according to the center of gravity; and obtaining subpixel-level positions of all sites uniformly distributed on the biochip by equal-size grids dividing method.

8. The gene sequencing instrument of claim 7, wherein "selecting the plurality of first template lines according to the template parameter, traversing the sums of pixel values respectively along the first direction and the second direction by the plurality of first template lines, to find the minimum total value of the sums of pixel values corresponding to the plurality of first template lines respectively along the first direction and the second direction" further comprises:
calculate a total value of the sums of pixel values respectively along the first direction and the second direction corresponding to the plurality of first template lines; and
obtaining the minimum total value among the total value of the sums of pixel values.

9. The gene sequencing instrument of claim 8, wherein "performing the pixel-level correction on the local area of the track lines" comprises:
obtaining the sums of pixel values of the local area of the track line along the first direction and the second direction respectively;
selecting a plurality of third template lines spaced apart from each other by a predetermined distance, to find the sums of pixel values of the local area of the track line by traversal;
obtaining a minimum total value of the sums of pixel values corresponding to the plurality of third template lines; and
obtaining the pixel-level position of the track line according to a position corresponding to the minimum total value.

10. The gene sequencing instrument of claim 9, wherein "obtaining the pixel-level position of the track line according to the position corresponding to the minimum total value" further comprises:
obtaining a pixel-level position of a valley of W-shaped line according to the position of the minimum total value, wherein the sums of pixel values of the local area of the track line comprises the W-shaped line; and
obtaining the pixel-level position of the track line according to the pixel-level position of the valley.

11. The gene sequencing instrument of claim 10, wherein the W-shaped line comprises a peak and two valleys, a pixel distance between one of the two valleys and the peak is constant, and a pixel-level position of the peak is obtained according to the pixel-level position of the valley, and the peak in the W-shaped line corresponds to the track line.

12. The gene sequencing instrument of claim 7, wherein "obtaining the subpixel-level positions of all sites uniformly distributed on the biochip by equal-size grids dividing method" further comprises:
obtaining a block area formed by the track crosses of two adjacent subpixel-level track lines along the first direction and the second direction, wherein the sites are arranged on the block area according to a preset rule; and
obtaining the subpixel-level position of all the sites on the block area by the equal-size grids dividing method.

13. The gene sequencing instrument of claim 7, wherein the gene sequencing instrument further comprises a chip platform, and an optical system, the chip platform supports the biochip, and the optical system captures the fluorescence images.

14. The gene sequencing instrument of claim 7, wherein the template parameter comprises parameter for designing the biochip.

15. The gene sequencing instrument of claim 7, wherein the plurality of first template lines comprises three first template lines, the sums of pixel values are sequentially searched by the three first template lines.

16. A gene sequencing system applied to a biochip, a pixel distance between track lines on the biochip is set according to template parameter, the gene sequencing system when executed by a gene sequencing instrument, cause a processor of the gene sequencing instrument to:
obtain at least one fluorescence image of the biochip;
select an interior local area of the fluorescence image by selecting an area of 80% of a width along a first direction and 10% of a length along a second direction of the fluorescence image as the interior local area, the first direction is perpendicular to the second direction;
obtain sums of pixel values in the interior local area of the fluorescence image respectively along the first direction and the second direction, and further configured to executed following functions: selecting a plurality of second template lines; moving the plurality of second template lines in the interior local area of the fluorescent image respectively along the first direction and the second direction; and calculating a sum of pixel values in grayscale in the interior local area of the fluorescent image covered by the plurality of second template lines, wherein the sum of pixel values in grayscale is a sum of the gray values of the pixels covered by the plurality of second template lines;
select a plurality of first template lines according to the template parameter, traverse the sums of pixel values respectively along the first direction and the second direction by the plurality of first template lines, to find a minimum total value of the sums of pixel values corresponding to the plurality of first template lines respectively along the first direction and the second direction, and a position of the minimum total value along the first direction or the second direction corresponding to a position of the track lines along the first direction or the second direction;
perform pixel-level correction on a local area of the track lines, and a track cross of the track lines after the pixel-level correction is a pixel-level track cross;
obtain other track crosses on the biochip according to the pixel-level track crosses, and perform the pixel-level correction on the other track crosses;
correct a position of a pixel-level track line by a center-of-gravity method to obtain a subpixel-level position of the track line, wherein "correcting the position of the pixel-level track line by the center-of-gravity method" further comprises: selecting an area with a width of 3 pixels and a length of 50 pixels as a local area of the pixel-level track line; obtaining a center of gravity of the local area of the pixel-level track line; and obtaining a subpixel-level position of the track line according to the center of gravity; and
obtaining subpixel-level positions of all sites uniformly distributed on the biochip by equal-size grids dividing method.

* * * * *